(12) United States Patent
Smith

(10) Patent No.: US 12,337,394 B1
(45) Date of Patent: Jun. 24, 2025

(54) QUICK CHANGE TOOL BLOCK ADAPTER, SYSTEMS, AND METHODS

(71) Applicant: Triad National Security, LLC, Los Alamos, NM (US)

(72) Inventor: Mark Justin Smith, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 293 days.

(21) Appl. No.: 18/182,081

(22) Filed: Mar. 10, 2023

(51) Int. Cl.
B23B 29/24 (2006.01)
B23B 27/10 (2006.01)
B23B 29/04 (2006.01)

(52) U.S. Cl.
CPC ............ B23B 29/246 (2013.01); B23B 27/10 (2013.01); B23B 29/043 (2013.01); *B23B 2231/04* (2013.01); *B23B 2231/24* (2013.01)

(58) Field of Classification Search
CPC ........... Y10T 82/16065; Y10T 82/2585; Y10T 82/2587; Y10T 82/2591; Y10T 407/14; Y10T 408/44; Y10T 408/453; Y10T 408/455; Y10T 408/458; Y10T 408/46; B23B 25/00; B23B 27/10; B23B 29/24; B23B 29/26; B23B 29/244; B23B 51/06; B23B 51/042; B23B 51/0486; B23B 2231/24; B23B 2250/12; B23C 5/28; B23C 2250/12; B23Q 11/10; B23Q 11/1023; B23Q 11/1084
See application file for complete search history.

(56) References Cited

U.S. PATENT DOCUMENTS

| | | | |
|---|---|---|---|
| 6,796,207 B1* | 9/2004 | Long, Jr. ................. | B23B 29/20 82/158 |
| 7,762,166 B2* | 7/2010 | Giannetti ............... | B23Q 11/10 407/11 |
| 8,650,994 B2* | 2/2014 | Roden ................... | B23B 29/244 82/158 |
| 2008/0083307 A1* | 4/2008 | Giannetti .............. | B23B 29/246 82/157 |
| 2010/0307301 A1* | 12/2010 | Zwara ..................... | B23B 29/24 82/158 |
| 2023/0249263 A1* | 8/2023 | Lin ..................... | B23B 27/1685 82/160 |

* cited by examiner

*Primary Examiner* — Nicole N Ramos
(74) *Attorney, Agent, or Firm* — Alston & Bird LLP

(57) ABSTRACT

Methods, systems, and/or the like are provided for an adapter. An adapter may include a block having a top surface, a bottom surface, and four sides; at least one adapter pocket configured to receive at least a portion of a toolset adapter for a toolset, wherein the adapter pocket is disposed on the top surface of the block; a plurality of fastener holes, each of the plurality of fastener holes being configured to receive one or more fastening devices, wherein the plurality of fastener holes are disposed annularly around the at least one adapter pocket; a plurality of machine attachment holes configured to receive one or more fasteners and thereby secure the adapter to a machining device, wherein the plurality of machine attachment holes are disposed on the top surface of the block; and a fluid hole being configured to receive one or more fluids.

19 Claims, 15 Drawing Sheets

US 12,337,394 B1

QUICK CHANGE TOOL BLOCK ADAPTER, SYSTEMS, AND METHODS

TECHNICAL FIELD

The present disclosure relates generally to machining devices, and more particularly to adapting tool blocks to lathes.

BACKGROUND

Machining devices such as lathes may be used for high precision machining and manufacturing tasks. Generally, the parts that are associated with most commercially available lathes have a varying generalized tool block regarding compacity, rigidity and consistency. However, for certain high precision machining and manufacturing tasks, an increase in compacity, rigidity and consistency may be required beyond that provided by the varying generalized turning abilities of commercially available lathe tool blocks. Users may seek out tool sets offering increase turning compacity, rigidity and consistency. Although such tool sets may exist and may be compatible with certain machining devices, these tool sets are not always configured to adapt to every machining device. Hence, a compatibility problem exists where users are incapable of improving the turning compacity, rigidity and consistency of their machining devices with commercially available tool sets.

Through applied effort, ingenuity, and innovation, Applicant has solved problems relating to adapting certain tool blocks to certain lathes by developing solutions embodied in the present disclosure, which are described in detail below.

BRIEF SUMMARY

In general, embodiments of the present disclosure provide methods, apparatuses, systems, and/or the like. According to various embodiments, there is provided an adapter block including a top surface, a bottom surface, and at least one side; at least one fastener hole extending from the top surface to the bottom surface, the at least one fastener hole being configured to receive a fastening device; at least one fluid hole in the at least one side, the at least one fluid hole being configured to receive a fluid; at least one adapter pocket in the top surface, the at least one adapter pocket being configured to receive at least a portion of a toolset adapter for a toolset; at least one thru hole in the at least one side, the at least one thru hole being configured to dispense the fluid received by the at least one fluid hole; and at least one internal passage fluidly connecting the at least one fluid hole to the at least one thru hole.

In some embodiments, the adapter block includes a protrusion on one of the top surface, the bottom surface, or the at least one side.

In some embodiments, the adapter block includes a clamp configured to receive one or more fasteners to secure the one or more protrusions to one or more surfaces of a machining device, wherein the clamp is disposed on one of the top surface, the bottom surface, or the at least one side.

In some embodiments, the adapter block includes a machine attachment hole configured to receive one or more fasteners and thereby secure the adapter block to a machining device, wherein the machine attachment hole is disposed on one of the top surface, the bottom surface, or the at least one side.

In some embodiments, a diameter of the machine attachment holes is selected from a group of ranges consisting of: 0.3-0.35 inches, 0.35-0.4 inches, 0.4-0.45 inches, 0.45-0.5 inches, 0.5-0.55 inches, 0.55-0.6 inches, 0.6-0.65 inches, 0.65-0.7 inches, 0.7-0.75 inches, 0.75-0.8 inches, and 0.8-0.85 inches.

In some embodiments, a diameter of the machine attachment hole is between 0.3 inches and 0.85 inches.

In some embodiments, the toolset is selected from a group consisting of a turning tool, a grooving tool, a threading tool, a front or back turning tool, and a knurling tool.

In some embodiments, the adapter block is composed of ultra-high strength steel.

In some embodiments, a diameter of the at least one internal passage is selected from a group of ranges consisting of: 0.1-0.11 inches, 0.11-0.12 inches, 0.12-0.13 inches, 0.13-0.14 inches, 0.14-0.15 inches, 0.15-0.16 inches, 0.16-0.17 inches, 0.17-0.18 inches, 0.18-0.19 inches, and 0.19-0.2 inches.

In some embodiments, a diameter of the at least one fastener hole is selected from a group of ranges consisting of: 0.05-0.1 inches, 0.1-0.15 inches, 0.15-0.2 inches, 0.2-0.25 inches, 0.25-0.3 inches, 0.3-0.35 inches, 0.35-0.4 inches, 0.4-0.45 inches, and 0.45-0.5 inches.

In some embodiments, a diameter of the at least one internal passage is between 0.1 inches and 0.2 inches.

In some embodiments, a diameter of the at least one fastener hole is between 0.05 inches and 0.5 inches.

In some embodiments, a diameter of the at least one adapter pocket is between 1.5 inches and 2.5 inches.

According to various embodiments, there is provided an adapter block system including a machining device including one or more sides, wherein each side of the one or more sides includes one or more receiving holes; a toolset including a toolset adapter and one or more turning tools, the one or more turning tools configured to engage a work piece; a chuck including a center and one or more jaws configured to hold the work piece, wherein the distance between the one or more tools and the center of the chuck defines a compacity of the system; an adapter block including: a top surface, a bottom surface, and at least one side, wherein one or more of the top surface, the bottom surface, and the at least one side define: one or more fastener holes, each of the one or more fastener holes being configured to receive one or more fastening devices; one or more fluid holes, each of the one or more fluid holes being configured to receive one or more fluids; at least one adapter pocket configured to receive at least a portion of a toolset adapter for a toolset; one or more thru holes configured to dispense the one or more fluids received by the one or more fluid holes to the toolset; and one or more passages configured to allow the one or more fluids to flow through the adapter block, wherein the one or more passages are disposed between the top surface and the bottom surface, and wherein the one or more passages fluidly connect the one or more fluid holes and the one or more thru holes.

In some embodiments, the compacity ranges from 17 inches to 20 inches.

According to various embodiments, there is provided an adapter including a block having a top surface, a bottom surface, and four sides; at least one adapter pocket configured to receive at least a portion of a toolset adapter for a toolset, wherein the adapter pocket is disposed on the top surface; a plurality of fastener holes, each of the plurality of fastener holes being configured to receive one or more fastening devices, wherein the plurality of fastener holes are disposed annularly around the at least one adapter pocket; a plurality of machine attachment holes configured to receive one or more fasteners and thereby secure the adapter to a machining device, wherein the plurality of machine attachment holes are disposed on the top surface; a fluid hole being configured to receive one or more fluids, wherein the fluid hole is disposed between the top and bottom surfaces; a thru hole configured to dispense to the toolset the one or more fluids received by the fluid hole, wherein the thru hole is disposed on the top surface; and a plurality of internal passages disposed within the block and configured to allow the one or more fluids to flow through the adapter block, wherein the plurality of internal passages fluidly connect the fluid hole and the thru hole.

In some embodiments, the adapter includes a protrusion on one of the top surface, the bottom surface, or the at least one side.

In some embodiments, the adapter includes a clamp configured to receive one or more fasteners to secure the protrusion to one or more surfaces of the machining device, wherein the clamp is disposed on one of the top surface, the bottom surface, or one of the four sides.

In some embodiments, a diameter of the plurality of machine attachment holes is between 0.3 inches and 0.85 inches.

In some embodiments, the toolset is selected from a group consisting of a turning tool, a grooving tool, a threading tool, a front or back turning tool, and a knurling tool.

In some embodiments, the block is composed of ultra-high strength steel.

In some embodiments, a diameter of the plurality of machine attachment holes is selected from a group of ranges consisting of: 0.3-0.35 inches, 0.35-0.4 inches, 0.4-0.45 inches, 0.45-0.5 inches, 0.5-0.55 inches, 0.55-0.6 inches, 0.6-0.65 inches, 0.65-0.7 inches, 0.7-0.75 inches, 0.75-0.8 inches, and 0.8-0.85 inches.

In some embodiments, the toolset is selected from a group consisting of a turning tool, a grooving tool, a threading tool, a front or back turning tool, and a knurling tool.

In some embodiments, a diameter of the plurality of internal passages is selected from a group of ranges consisting of: 0.1-0.11 inches, 0.11-0.12 inches, 0.12-0.13 inches, 0.13-0.14 inches, 0.14-0.15 inches, 0.15-0.16 inches, 0.16-0.17 inches, 0.17-0.18 inches, 0.18-0.19 inches, and 0.19-0.2 inches.

In some embodiments, a diameter of the plurality of fastener holes is selected from a group of ranges consisting of: 0.05-0.1 inches, 0.1-0.15 inches, 0.15-0.2 inches, 0.2-0.25 inches, 0.25-0.3 inches, 0.3-0.35 inches, 0.35-0.4 inches, 0.4-0.45 inches, and 0.45-0.5 inches.

In some embodiments, a diameter of the plurality of internal passages is between 0.1 inches and 0.2 inches.

In some embodiments, a diameter of the plurality of fastener holes is between 0.05 inches and 0.5 inches.

In some embodiments, a diameter of the at least one adapter pocket is between 1.5 inches and 2.5 inches.

According to various embodiments, there is provided a method for adapting a machining device to a toolset, the method including fixedly attaching an adapter block to the machining device, the machining device including one or more sides, wherein each side of the one or more sides includes one or more receiving holes; the adapter block including: a top surface, a bottom surface, and at least one side, wherein one or more of the top surface, the bottom surface, and the at least one side define: one or more fastener holes, each of the one or more fastener holes being configured to receive one or more fastening devices; one or more fluid holes, each of the one or more fluid holes being configured to receive one or more fluids; at least one adapter pocket configured to receive at least a portion of a toolset adapter for a toolset; one or more thru holes configured to dispense the one or more fluids received by the one or more fluid holes to the toolset; and one or more passages configured to allow the one or more fluids to flow through the adapter block, wherein the one or more passages are disposed between the top surface and the bottom surface, and wherein the one or more passages fluidly connect the one or more fluid holes and the one or more thru holes, the method further including: fixedly attaching the toolset to the adapter block, the toolset including the toolset adapter and one or more turning tools, the one or more turning tools configured to engage a work piece; engaging the workpiece held by a chuck with the one or more turning tools of the toolset, wherein the chuck includes a center and one or more jaws configured to hold the work piece wherein the distance between the one or more tools and the center of the chuck defines a compacity of the system.

According to various embodiments, there is provided a method for manufacturing an adapter, the method including: machining at least one adapter pocket onto a top or bottom surface of the adapter, wherein the at least one adapter pocket is configured to receive at least a portion of a toolset adapter for a toolset; machining a plurality of fastener holes annularly around the at least one adapter pocket, wherein the plurality of fastener holes are configured to receive one or more fastening devices; machining a plurality of machine attachment holes onto the top or bottom surface of the adapter, wherein the plurality of machine attachment holes are configured to receive one or more fasteners and thereby secure the adapter to a machining device; machining a fluid hole between the top and bottom surfaces of the adapter, wherein the fluid hole is disposed between the top and bottom surfaces; machining a thru hole on the top or the bottom surface of the adapter; and machining a plurality of internal passages between the top and bottom surfaces such that the plurality of internal passages fluidly connect the fluid hole and the thru hole.

The above summary is provided merely for purposes of summarizing some non-limiting example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to similar elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Example Adapter Block System and Apparatus

Figure 1A:
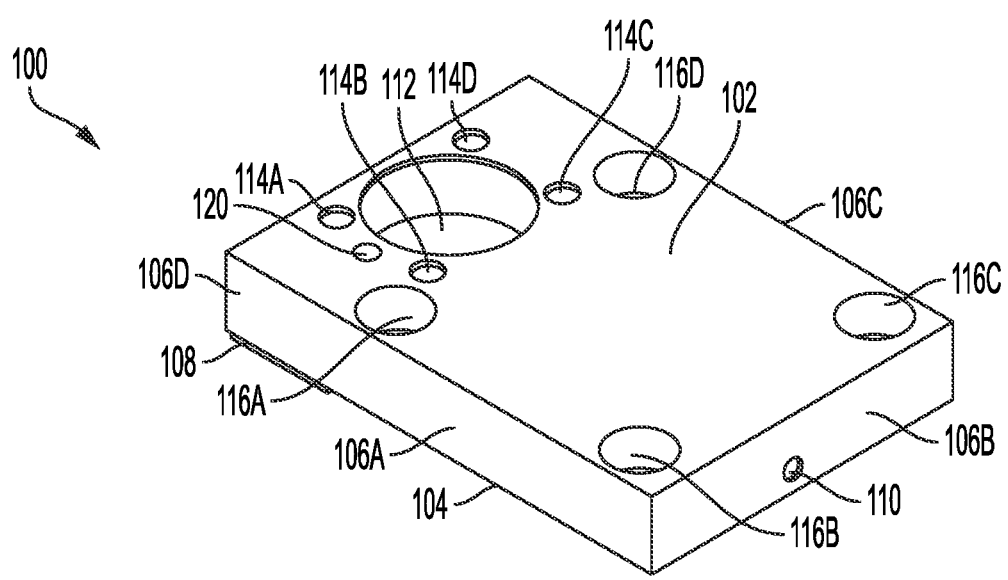
FIG. 1A illustrates an isometric view of an example adapter block in accordance with various embodiments of the present disclosure.

FIG. 1A illustrates an isometric view of an example adapter block 100, in accordance with various embodiments of the present disclosure. In some embodiments, the block 100 may have a block structure defined by a top surface 102, a bottom surface 104, and at least one side 106A, 106B, 106C, 106D. Although four sides 106A-D (a plurality of sides) are shown in the associated figures, it will be understood that the block 100 may include only a single side 104A (e.g., if the block 100 is substantially circular or oval-shaped).

In some embodiments, a protrusion 108 may be disposed on the bottom surface 104 of the block 100. In some embodiments, the protrusion 108 may have an angled side. In further embodiments, a clamp hole 110 is disposed on or along one of the plurality of sides of the adapter block. In some embodiments, the clamp hole 110 may be a threaded hole to which a clamp or similar fastener may be fixed.

In some embodiments, the block 100 may be composed of steel, such as 4340 steel. It will be understood, though, that the block 100 may be composed of any suitable material(s), not limited to steel. Though the adapter block 100 is shown as substantially rectangular in FIG. 1A, it will be understood that, in some embodiments, the adapter block 100 may be a variety of shapes (e.g., triangular block, round disk, elliptical disk, etc.), not limited to a rectangular block.

In some embodiments, and as will be described with greater detail later in this disclosure, the example adapter block 100 may be configured to receive an adapter for an example toolset. In some embodiments, the adapter may be an adapter for the Kennametal KM-40 tool system, but it will be understood that the adapter block 100 may be configured to receive adapters for a variety of tool systems. In some embodiments, at least a portion of an adapter for the example toolset may be inserted or otherwise disposed on, in, or around an adapter pocket 112. In other embodiments, a plurality of fastener holes 114A, 114B, 114C, 114D may be arranged around the adapter pocket 112. In some embodiments, the plurality of fastener holes 114A-D may be configured to secure the adapter for the example toolset to the block 100. For example, in some embodiments, the adapter for the example toolset may have a plurality of holes that correspond to one or more of the fastener holes 114A-D, and a user may insert fasteners (such as bolts) through the corresponding attachment holes and into the fastener holes 114A-D. The user may thereby secure the toolset adapter to the adapter block 100. In some embodiments, the fastener holes may be aligned symmetrically around the adapter pocket 112, as shown in at least FIG. 1A. However, it will be understood that the holes 114A-D may be arranged in various configuration and at various points on the block 100. In some embodiments, the one or more fastener holes may define one or more diameters selected from a group of ranges consisting of: 0.05-0.1 inches, 0.1-0.15 inches, 0.15-0.2 inches, 0.2-0.25 inches, 0.25-0.3 inches, 0.3-0.35 inches, 0.35-0.4 inches, 0.4-0.45 inches, and 0.45-0.5 inches. In some embodiments, the adapter pocket defines a diameter selected from a range consisting of 1.5-2.5 inches.

In additional embodiments, and as will be described with greater detail later in this disclosure, the block 100 may be configured to be attached to a machining device. In some embodiments, this machining device may be a lathe. In further embodiments, the lathe may be a turret lathe, such as the Okuma LB4000 EXII CNC Lathe. It will be understood that the block may be configured to be attached to a variety of machining devices, not limited to lathes or turret lathes. In some embodiments, the adapter block 100 may be attached to the machining device at a plurality of machine attachment holes 116A, 116B, 116C, and 116D, which in some embodiments may be disposed on the top surface 102 of the block 100. In some embodiments, the machine attachment holes 116A-D may be aligned with corresponding holes on the machining device, and one or more fasteners may be inserted into the holes 116A-D and the corresponding holes on the machining device, thereby securing the block 100 as necessary to the machining device. In some embodiments, the holes 116A-D may be counterbored holes. In other embodiments, the block 100 may be secured to the machining device by means of cap screws inserted into the holes 116A-D. In some embodiments, the holes 116A-D may be arranged symmetrically on the block 100, as shown in at least FIG. 1A. However, it will be understood that the holes 116A-D may be arranged in various configuration and at various points on the block 100. In some embodiments, the one or more machine attachment holes 116A-D define one or more diameters selected from a group of ranges consisting of: 0.3-0.35 inches, 0.35-0.4 inches, 0.4-0.45 inches, 0.45-0.5 inches, 0.5-0.55 inches, 0.55-0.6 inches, 0.6-0.65 inches, 0.65-0.7 inches, 0.7-0.75 inches, 0.75-0.8 inches, and 0.8-0.85 inches.

Figure 1B:
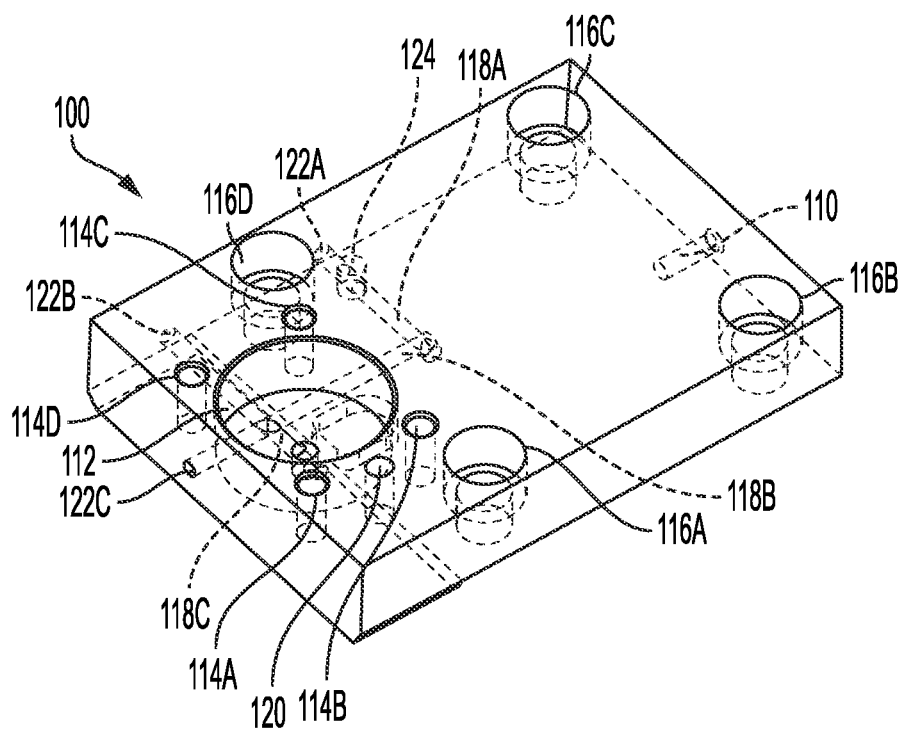
FIG. 1B illustrates an isometric, semi-transparent view of an example adapter block in accordance with various embodiments of the present disclosure.

FIG. 1B illustrates an isometric, semi-transparent view of the example adapter block 100 in accordance with various embodiments of the present disclosure. In some embodiments, and as shown in FIG. 1B, the adapter block 100 may include a plurality of internal passages 118A, 118B, and 118C. In some embodiments, the plurality of internal passages 118A-C may be pipes or passages configured to supply fluid (e.g., liquid coolant) through the adapter block 100. The fluid may, in some embodiments, be standard fluid used for cooling machine parts during operation. For example, in some embodiments, the fluid may be an oil-based fluid, a water-based fluid or a chemical-based fluid. In some embodiments, the fluid may flow through the adapter block 100 and out of a thru hole 120, which in some embodiments may be disposed on a top surface 102 of the block 100. In some embodiments, the thru hole 120 is for aligning the corresponding alignment pin on the toolset adapter to block 100, as will be shown and described later in this disclosure. In some embodiments, this may allow a user to pump fluid through the adapter block and to the toolset. According to various embodiments, the internal passages 118A-C may be created in the adapter block 100 by means of drill holes 122A, 122B, and 122C that are drilled into the block 100 to create the passages 118A-C. In some embodiments, the drill holes 122A-C may be small in diameter, thereby making the passages 118A-C also small in diameter. In some embodiments, the passages 118A-C may define diameters selected from a group of ranges consisting of: 0.1-0.11 inches, 0.11-0.12 inches, 0.12-0.13 inches, 0.13-0.14 inches, 0.14-0.15 inches, 0.15-0.16 inches, 0.16-0.17 inches, 0.17-0.18 inches, 0.18-0.19 inches, and 0.19-0.2 inches.

In some embodiments, the internal passages 118A-C may be 0.159" in diameter. It will be understood that the drill holes 122A-C may be plugged or otherwise blocked off after the internal passages have been created, thereby preventing the fluid from spilling unnecessarily out of the block 100. In some embodiments, the fluid may be pumped into the passages 118A-C and into the adapter block by the machining device. In some embodiments, the machining device may input fluid into the block at a fluid hole 124. In some embodiments, the machining device may have an internal fluid system, such as a 1,000 psi high pressure fluid system, that may pump fluid into the fluid hole 124. In other embodiments, the fluid may be pumped into the passages 118A-C by a fluid pump that is separate from the machining device. In further embodiments, a combination of the two fluid pumping methods may be used. In some embodiments, the use of the passages 118A-C of the adapter block for supply fluid may prevent shoot-offs of fluid, breaks in machinery, and system failures. In some embodiments, and as will be described later in this disclosure, the block 100 may improve rigidity and efficiency for the machining device while the device is in operation, as well as improving compacity for the device.

Figure 2A:
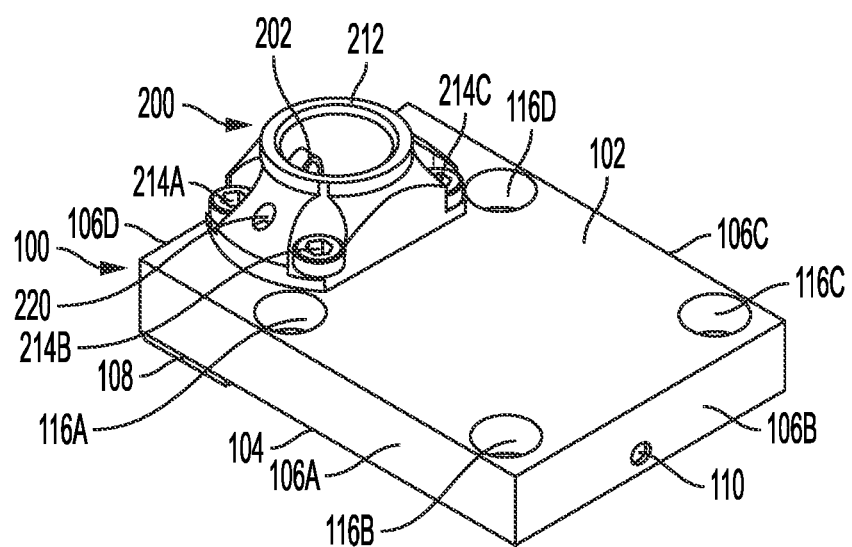
FIG. 2A illustrates an example isometric view of an example adapter block with an example toolset adapter in accordance with various embodiments of the present disclosure.
Figure 2B:
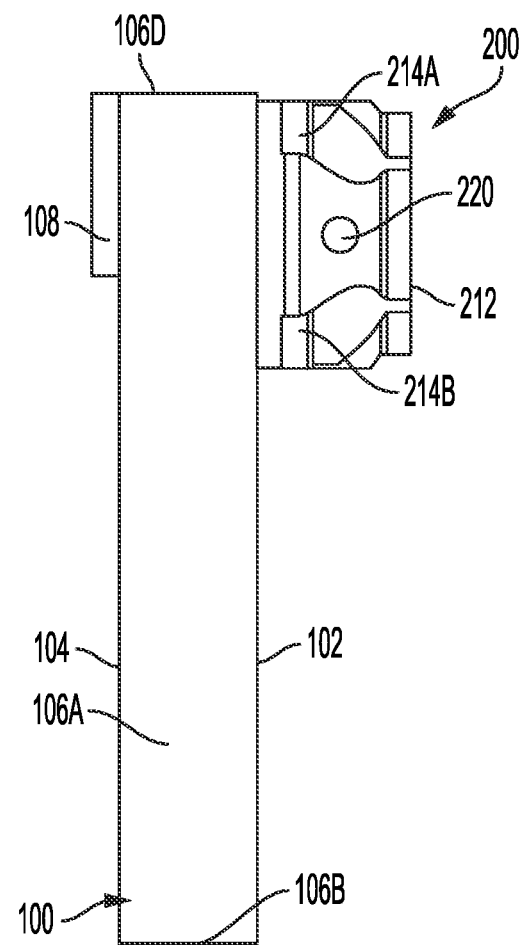
FIG. 2B illustrates a side view of an example adapter block with an example toolset adapter in accordance with various embodiments of the present disclosure.

FIG. 2A illustrates an example isometric view of example adapter block 100 with an example toolset adapter 200 in accordance with various embodiments of the present disclosure, and FIG. 2B illustrates an example side view of the same. In some embodiments, the toolset adapter 200 may have a tool hole 212 configured to receive a turning tool head from the corresponding toolset. In some embodiments, the tool hole 212 may be aligned with the adapter pocket/counterbore 112 of the adapter block 100. In some embodiments, the toolset adapter 200 may have a plurality of corresponding fastener holes 214A, 214B, 214C, and 214D. In some embodiments, these holes 214A-D may correspond with the holes 114A-D of the block 100. In some embodiments, the toolset adapter 200 may have a corresponding alignment pin 220 that may be configured to be aligned with the thru hole 120 of the adapter block 100. In some embodiments, the hole 120 and the alignment pin 220 may be aligned such that the fluid flowing through the adapter block flows out of the toolset adapter 200. In some embodiments, and as shown in at least FIG. 2B, the toolset adapter 200 may be flush with the adapter block 100. In some embodiments, the toolset adapter 200 may be disposed on the top surface 102 of the block 100 and on the same end of the block where the protrusion 108 is disposed. However, it will be understood that the toolset adapter 200 may be disposed at a variety of different locations on the block 100.

Figure 2C:
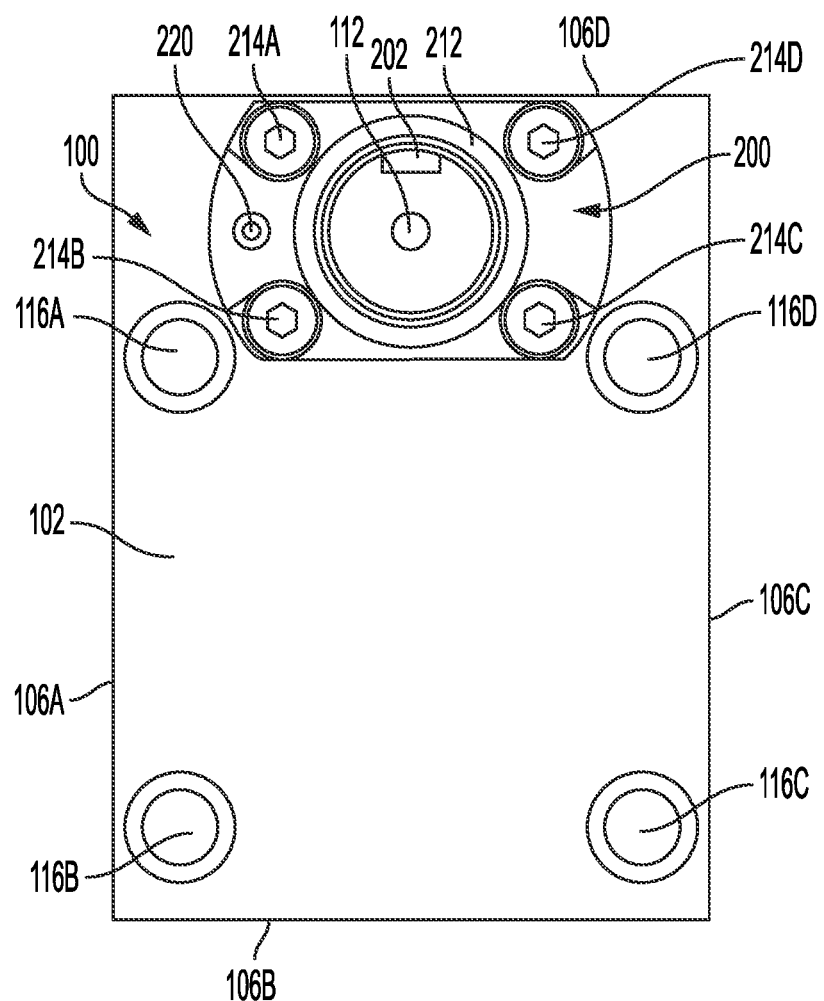
FIG. 2C illustrates a top view of an example adapter block with an example toolset adapter in accordance with various embodiments of the present disclosure.

FIG. 2C illustrates a top view of an example adapter block 100 with an example toolset adapter 200 in accordance with various embodiments of the present disclosure. As shown in FIGS. 2A and 2C, the adapter 200 may have a mechanism 202 (e.g., a tab) that may be locked or unlocked to secure a turning tool head (for example, the mechanism 202 may be extended to lock and hold a turning tool head in the adapter 200, or retracted to unlock and exchange a turning tool head in the adapter 200).

Figure 3A:
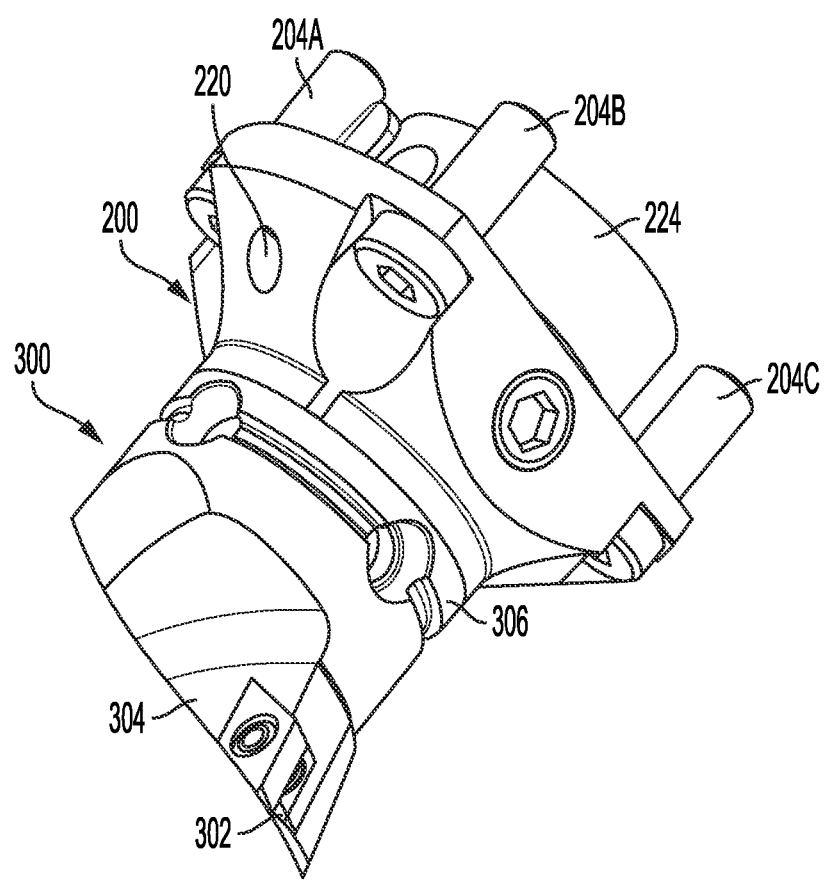
FIG. 3A illustrates an angled view of an example toolset adapter and turning tool head with an example tool in accordance with various embodiments of the present disclosure.
Figure 3B:
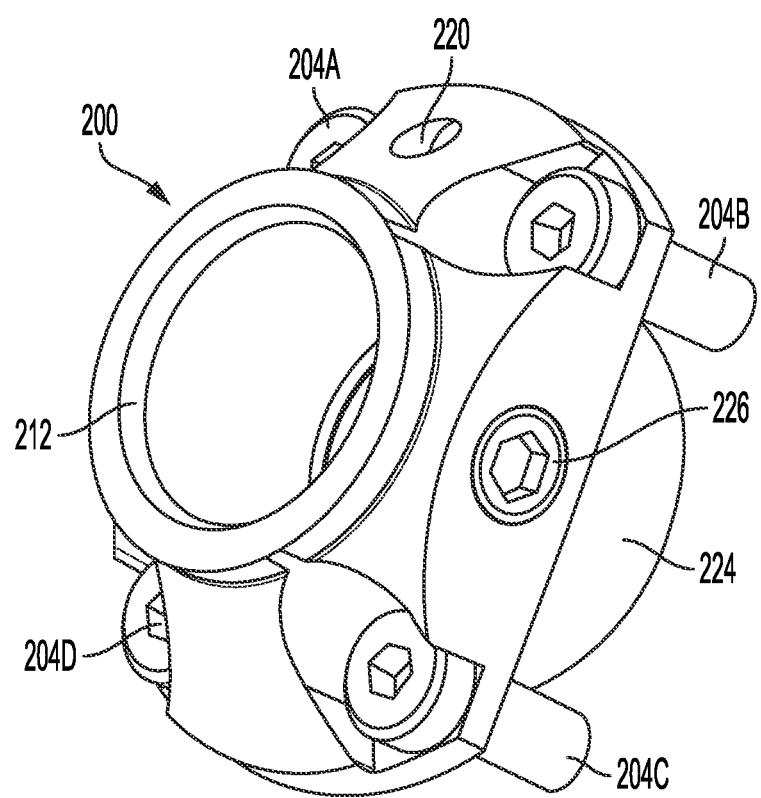
FIG. 3B illustrates an angled view of an example toolset adapter in accordance with various embodiment of the present disclosure.
Figure 3C:
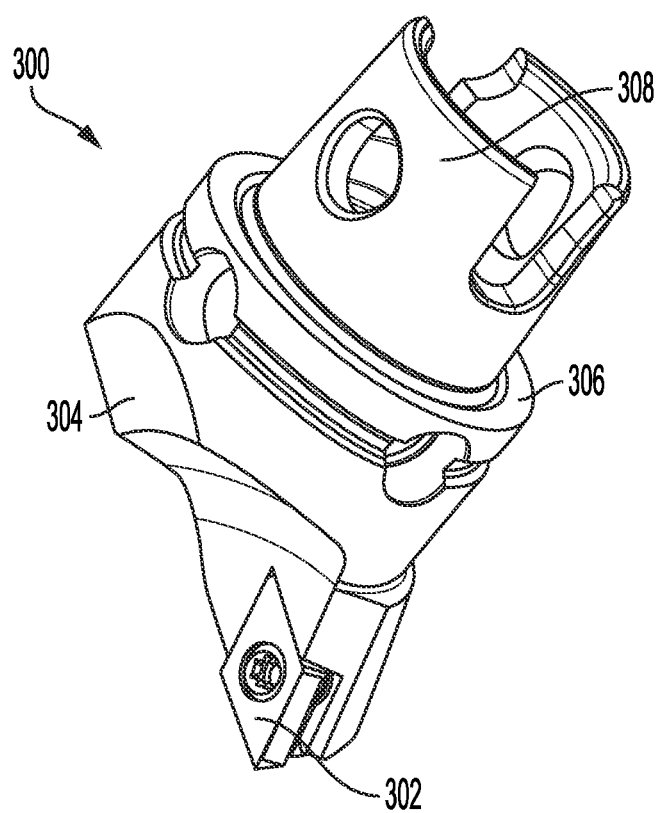
FIG. 3C illustrates an angled view of an example turning tool head in accordance with various embodiments of the present disclosure.

FIGS. 3A, 3B, and 3C illustrate angled views of an example toolset adapter 200 with an example turning tool head 300 in accordance with various embodiments of the present disclosure. FIG. 3A illustrates them in combination according to some embodiments, while FIG. 3B illustrates the toolset adapter 200 and FIG. 3C illustrates the turning tool head 300. In some embodiments, the toolset adapter 200 may include a plurality of bolts 204A, 204B, 204C, and 204D configured to be inserted into the fastener holes 114A-D and 214A-D, respectively. In some embodiments, the bolt 204A may be configured to be inserted into 114A and 214A, and the bolts 204B-204C may be similarly configured to be inserted into 114B-D and 214B-D, respectively.

As shown in at least FIGS. 3A and 3B, and according to some embodiments, the adapter 200 may have an attachment body component 224. In some embodiments, the attachment component 224 may be configured to be inserted into the pocket/counterbore 112 of the adapter block 100. In some embodiments, this insertion of the attachment component 224 may secure or aid in securing the adapter 200 to the block 100, in addition to attachment by the plurality of bolts 204A-D. In some embodiments the adapter 200 may include a tightening bolt 226 that may be threaded through the adapter 200 and configured to tighten to fix the adapter 200 to an example turning tool head 300 or loosened to release the example turning tool head 300.

In some embodiments, the turning tool head 300 may include a machining component 302 disposed on its engagement end 304. In some embodiments, the engagement end 304 may be angled (as shown in at least FIG. 3A), but in other embodiments the engagement end 304 may be many different configurations. In some embodiments, the turning tool head 300 may have a connection end 306 that is configured to be operably or fixedly connected to the toolset adapter 200; that is, in some embodiments, the connection end 306 ensures that the turning tool head 300 remains connected to the toolset adapter 200 when the turning tool head is in use. As shown in at least FIG. 3C, the connection end 306 may have an attachment mechanism 308 that is configured to be inserted into the adapter 200 and locked in place by mechanism 202. In some embodiments, the mechanism may be substantially cylindrical and configured to be inserted into adapter 200. For example, in some embodiments, the turning tool head 300 may be part of a larger machining system (such as a lathe system) and may be used to machine a workpiece for a variety of applications. Additional operation of the turning tool head 300 in conjunction with the toolset adapter 200 and the adapter block 100 will be described in greater detail later in this disclosure. In some embodiments, the tool may be selected from a group consisting of many different turning tool configurations, a grooving tool, a threading tool, a front or back turning tool, and a knurling tool. However, it will be understood that a wide variety of tools may be used as necessary.

Figure 4A:
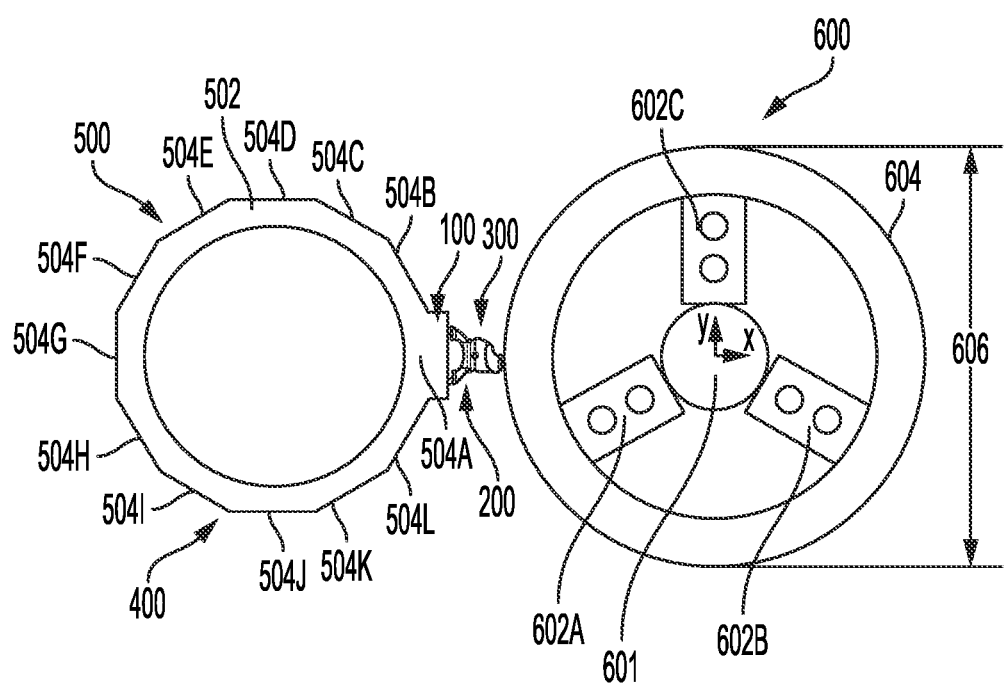
FIG. 4A illustrates an example front view of lathe chuck and back view example of quick change system in accordance with various embodiments of the present disclosure.
Figure 4B:
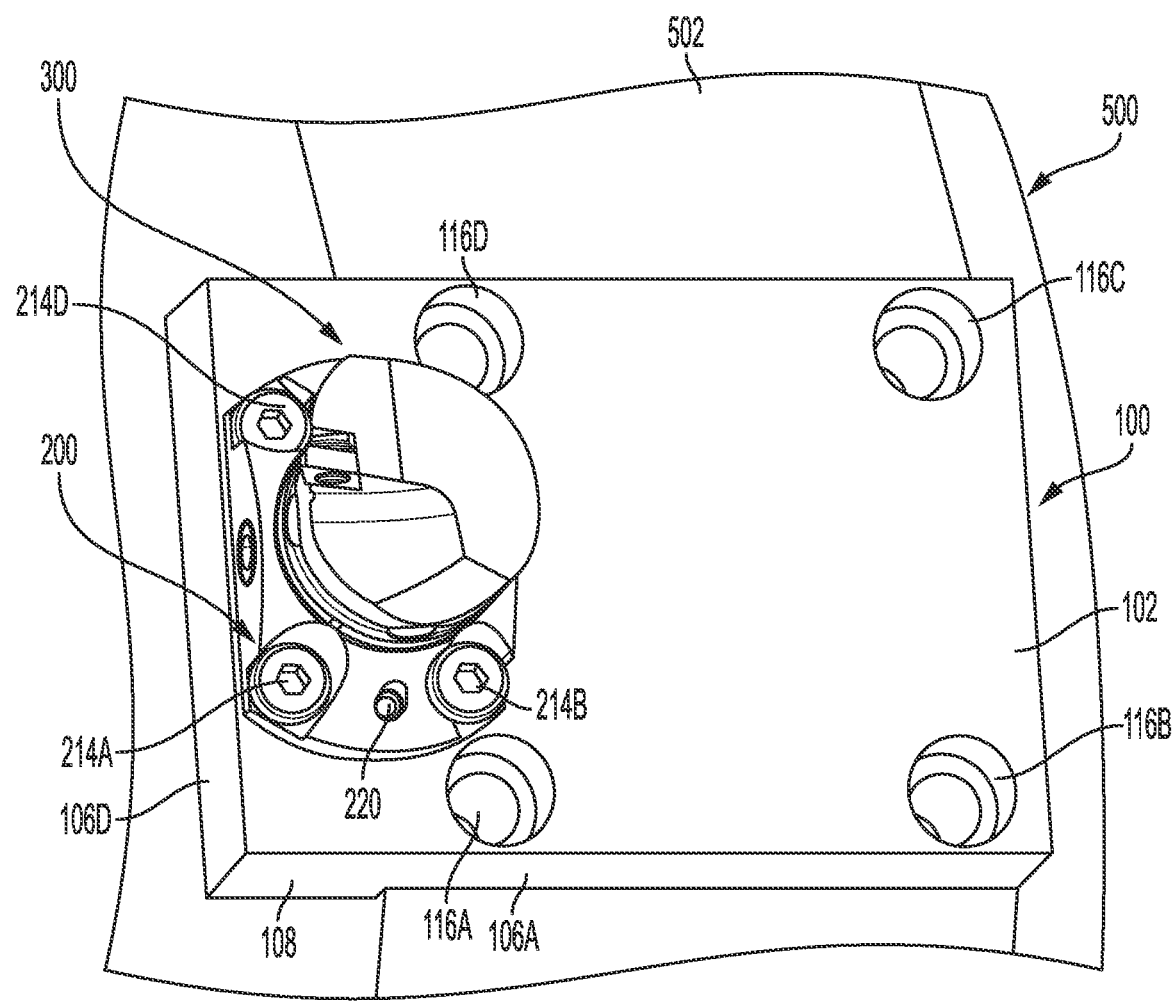
FIG. 4B illustrates an example angled view of an example quick change system in accordance with various embodiments of the present disclosure.

FIGS. 4A and 4B are example front view of the lathe chuck, a back view of the tool block adapter and angled views, respectively, of an example quick change system 400 in accordance with various embodiments of the present disclosure. FIG. 4A shows, according to some embodiments, the adapter block 100 secured to a machine 500, with the toolset adapter 200 secured to the block and a turning tool head 300 secured to the toolset adapter 200. In some embodiments, the machine 500 may be a machining device, such as a lathe or a turret lathe. Additionally, in some embodiments, the system 400 may include a lathe chuck 600. In some embodiments, the chuck 600 may be configured to hold a work piece for machining by the system 400. In some embodiments, the adapter block 100 may be flush with the machine 500. In some embodiments, the machine 500 may have a ringed portion 502 to which the bottom surface 104 of the adapter block 100 is flush. In other embodiments, the protrusion 108 of the adapter block may be "hooked" onto the ringed portion 502 as shown in at least FIG. 4B. In some embodiments, a user may fix a clamp to the clamp hole 110 to allow a user to tightly secure the protrusion 108 to the machine 500. In some embodiments, the machine 500 may have a plurality of sides 504A, 504B, 504C, 504D, 504E, 504F, 504G, 504H, 504I, 504J, 504K, and 504L. It will be understood that, in some embodiments, the machine 500 may have more than 12 sides, and in other embodiments the machine 500 may have fewer than 12 sides. In various embodiments, one or more adapter blocks 100 may be attached to one or more the plurality of sides 504A-L. For example, in some embodiments, three adapter blocks 100 may be attached to three sides of the machine 500. In some embodiments, the system 400 may be configured to use each of these adapter blocks 100 with multiple adapters 200 and multiple turning tool heads 300 for use on a work piece. In some embodiments, the protrusion 108 of the adapter block 100 may be angled to allow more than one adapter block 100 to be attached to the plurality of sides 504A-L of the machine 500.

Figure 4C:
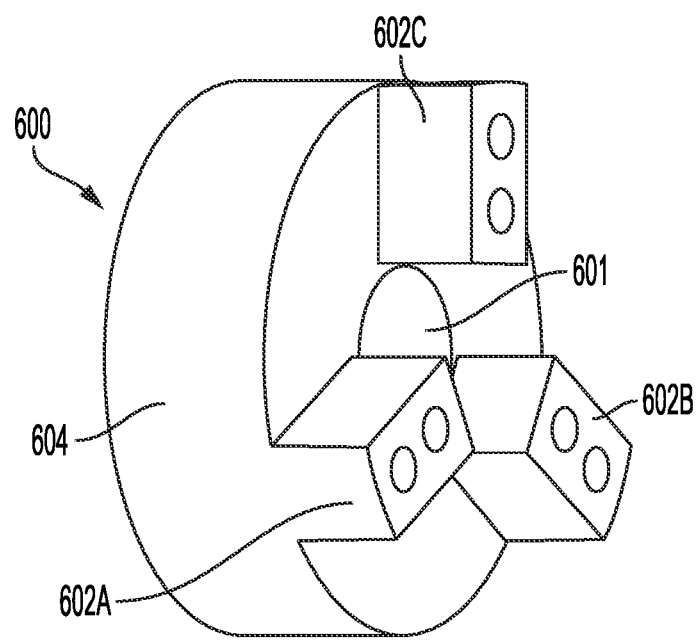
FIG. 4C illustrates an example angled view of an example lathe chuck in accordance with various embodiments of the present disclosure.
Figure 4D:
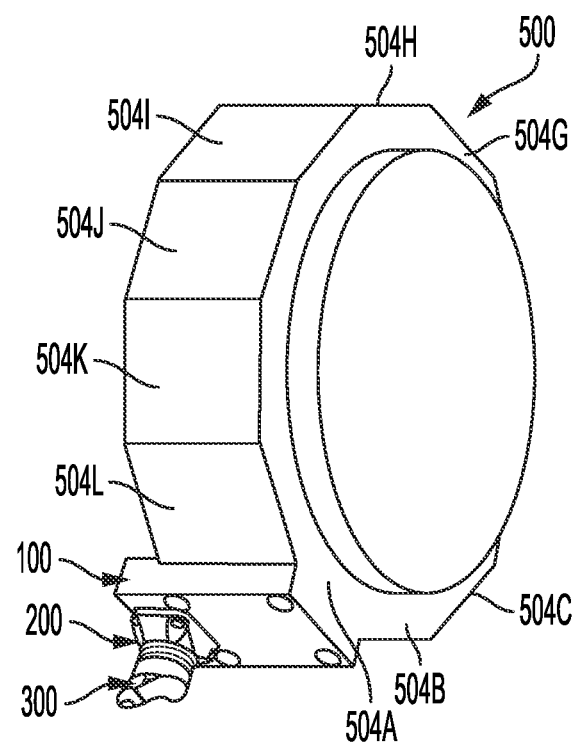
FIG. 4D illustrates an example angled view of an example machining device in accordance with various embodiments of the present disclosure.

FIG. 4C is an example angled view of an example lathe chuck 600 in accordance with various embodiments of the present disclosure. FIG. 4D is an example angled view of an example machine 500 to which an adapter block 100 has been secured. Additionally, FIG. 4D shows the toolset adapter 200 and an associated turning tool head 300 secured to the adapter block 100.

Figure 4E:
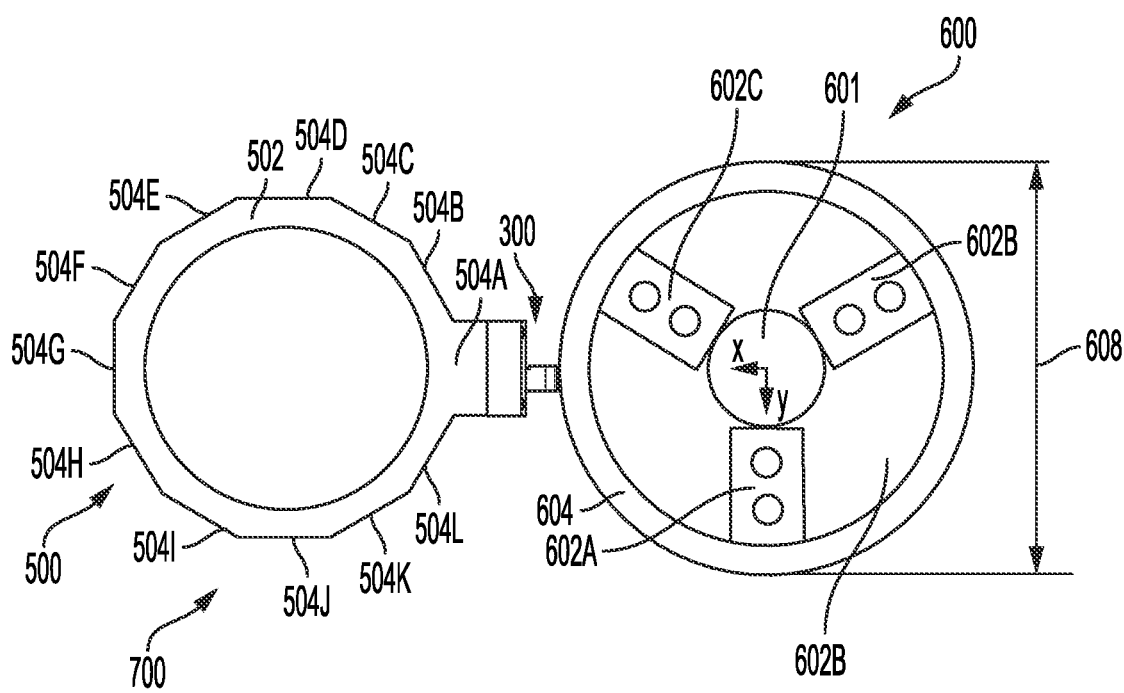
FIG. 4E illustrates an example front view of lathe chuck and back view example standard tool block.

In some embodiments, the chuck may have a plurality of jaws 602A, 602B, 602C. In some embodiments, the chuck may have a center 601 and an external edge 604. In some embodiments, a work piece may be disposed on or inside of the center 601 and configured to be engaged by the turning tool head 300. In some embodiments, one or more of the plurality of jaws 602A-C may be configured to secure the work piece inside the chuck 600. In some embodiments, one or more of the chuck 600 or the jaws 602A-C may be configured to rotate or pivot. In some embodiments, an external edge 604 that is positioned farther from the center 601 may indicate increased compacity for the system 400. The increased compacity may be measured by the diameter 606 (FIG. 4A). FIG. 4E illustrates an example front view of lathe chuck and back view example of a standard generalized tool block system 700. In some embodiments, the system 700 may use a machine 500 as described above with respect to at least FIGS. 4A, 4B, and 4D. However, the system 700 in FIG. 4E lacks the adapter block 100. Hence, the chuck 600 has a reduced compacity 608 that may be less than the compacity of the lathe chuck 600 as described above with respect to system 400, which utilizes the adapter block 100.

In some embodiments, the increased compacity may be up to 19.5" inches. By comparison, without the adapter block 100, the system's compacity (as indicated in FIG. 4E), is 17.5" inches or less. In some embodiments, this compacity may be increased due to the adapter block 100. This increased compacity can be seen at least by comparing a system 400 without an adapter block 100, as shown in FIG. 4E, with the system 400 with an adapter block 100, as shown in FIGS. 4A-4D. As can be seen when comparing FIGS. 4A and 4E, the reduced size of the block 100 (i.e., the reduced distance between the top and bottom surfaces) may provide increased compacity to the system 400 when compared with the system 700, which lacks the adapter block 100.

Example Methods of Use and Manufacture

Figure 5:
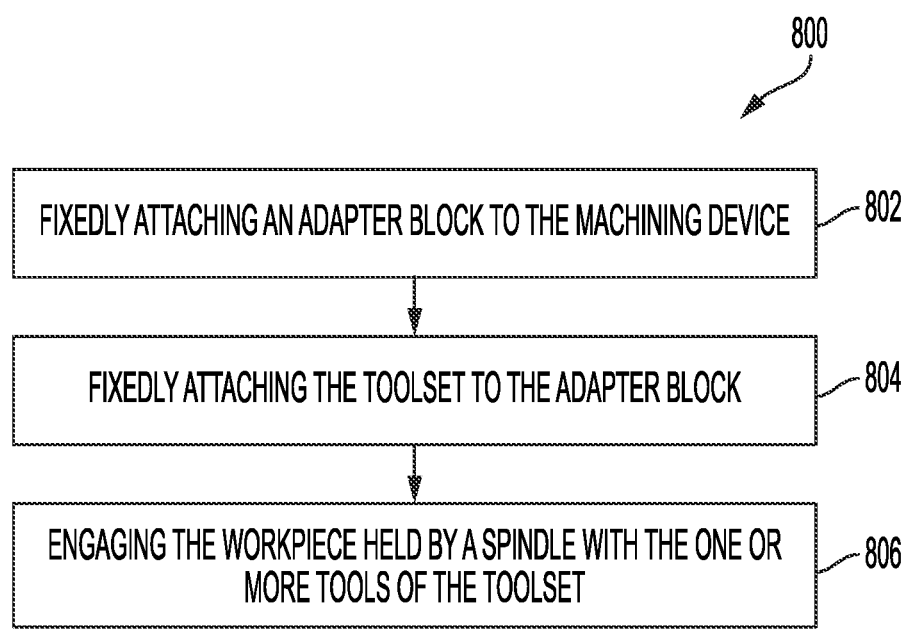
FIG. 5 is a flow chart illustrating an example method of use for an example adapter block in accordance with various embodiments of the present disclosure.

FIG. 5 is a flow chart illustrating an example method 800 of use for an example adapter block in accordance with various embodiments of the present disclosure. The method 800 is described with respect to the systems, apparatuses, and components described previously and shown in the associated figures. However, it will be understood that, in some embodiments, the method may be used with a variety of suitable systems and components for adapting an example adapter block to a machining device. In some embodiments, the method 800 may include a step 802 of fixedly attaching the adapter block 100 to the machine 500. In other embodiments, the method 800 may include a step 804 of fixedly attaching the turning tool head 300 to the adapter block 100. In further embodiments, the method 800 may include a step 806 of engaging a workpiece held by the chuck 600 with the one or more tools of the turning tool head 300. Additional method steps for the method 800 may include pouring fluid into the fluid hole such that fluid flows through the one or more internal passages of the adapter block. Further steps may include attaching additional adapter blocks to the machining device and additional toolsets to these additional adapters.

Figure 6:
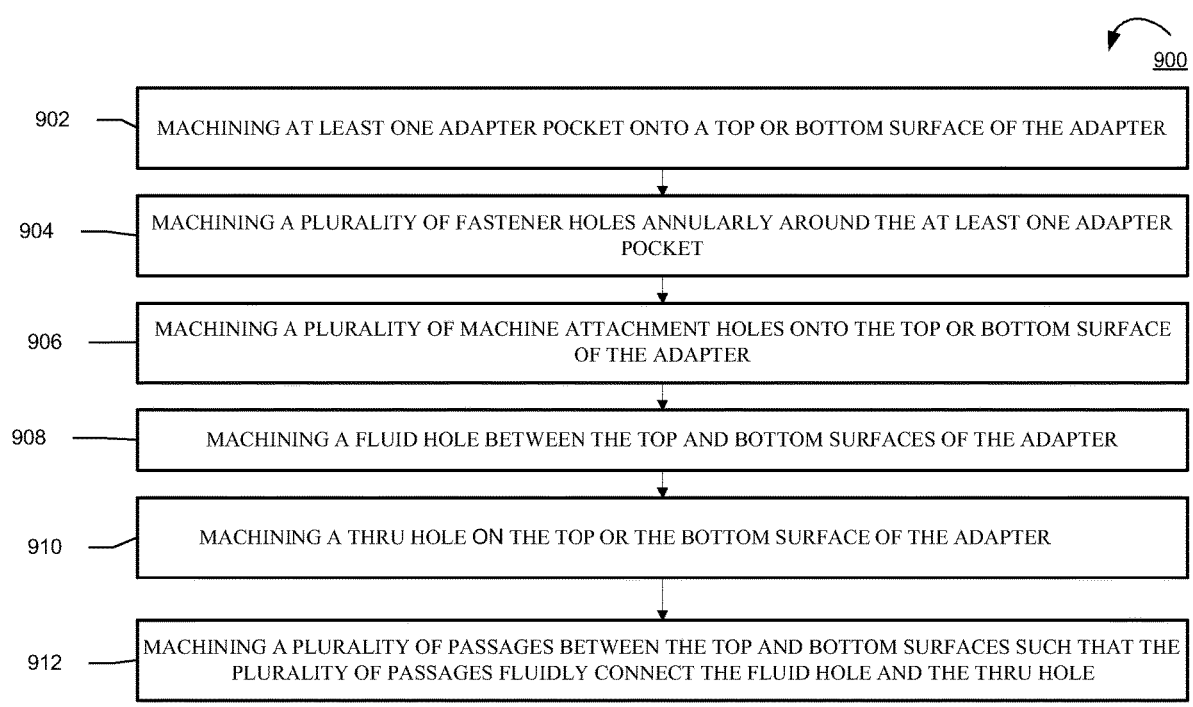
FIG. 6 is a flow chart illustrating an example method of manufacture for an example adapter block in accordance with various embodiments of the present disclosure.

FIG. 6 is a flow chart illustrating an example method 900 of manufacture for an example adapter block in accordance with various embodiments. The method 900 is described with respect to the systems, apparatuses, and components described previously and shown in the associated figures. However, it will be understood that, in some embodiments, the method may be used to manufacture any suitable systems, apparatuses, and components. In some embodiments, the method 900 may include a step 902 of machining at least one adapter pocket onto a top or bottom surface of the adapter. In some embodiments, the method 900 may include a step 904 of machining a plurality of fastener holes annularly around the at least one adapter pocket. In some embodiments, the method 900 may include a step 906 of machining a plurality of machine attachment holes onto the top or bottom surface of the adapter. In some embodiments, the method 900 may include a step 908 of machining a fluid hole between the top and bottom surfaces of the adapter. In some embodiments, the method 900 may include a step 910 of machining a thru hole between the top or the bottom surface of the adapter. In some embodiments, the method 900 may include a step 912 of machining a plurality of internal passages between the top and bottom surfaces such that the plurality of internal passages fluidly connect the fluid hole and the thru hole. In some embodiments, the machining may be performed by drilling. In other embodiments, the machining may be performed using other cutting tools or techniques.

CONCLUSION

Many modifications and other various embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific various embodiments disclosed and that modifications and other various embodiments are intended to be included within the scope of the appended claims. Although specific terms are employed herein, they are used in a generic and descriptive sense only and not for purposes of limitation.

The invention claimed is:

1. An adapter block comprising:
   a top surface, a bottom surface, and at least one side;
   at least one fastener hole extending from the top surface to the bottom surface, the at least one fastener hole being configured to receive a fastening device;
   at least one fluid hole in the at least one side, the at least one fluid hole being configured to receive a fluid;
   at least one adapter pocket in the top surface, the at least one adapter pocket being configured to receive at least a portion of a toolset adapter for a toolset;
   at least one thru hole extending from the top surface to the bottom surface, the at least one thru hole being configured to dispense the fluid received by the at least one fluid hole; and
   at least one internal passage oriented orthogonal relative to the at least one thru hole and fluidly connecting the at least one fluid hole to the at least one thru hole.

2. The adapter block of claim 1, further comprising a protrusion on one of the top surface, the bottom surface, or the at least one side.

3. The adapter block of claim 2, further comprising a clamp configured to receive one or more fasteners to secure the protrusion to one or more surfaces of a machining device, wherein the clamp is disposed on one of the top surface, the bottom surface, or the at least one side.

4. The adapter block of claim 1, further comprising a machine attachment hole configured to receive one or more fasteners and thereby secure the adapter block to a machining device, wherein the machine attachment hole is disposed on one of the top surface, the bottom surface, or the at least one side.

5. The adapter block of claim 4, wherein a diameter of the machine attachment hole is between 0.3 inches and 0.85 inches.

6. The adapter block of claim 1, wherein the toolset is selected from a group consisting of a turning tool, a grooving tool, a threading tool, a front or back turning tool, and a knurling tool.

7. The adapter block of claim 1, wherein the adapter block is composed of ultra-high strength steel.

8. The adapter block of claim 1, wherein a diameter of the at least one internal passage is between 0.1 inches and 0.2 inches.

9. The adapter block of claim 1, wherein a diameter of the at least one fastener hole is between 0.05 inches and 0.5 inches.

10. The adapter block of claim 1, wherein a diameter of the at least one adapter pocket is between 1.5 inches and 2.5 inches.

11. An adapter comprising:
    a block comprising a top surface, a bottom surface, and four sides;
    at least one adapter pocket configured to receive at least a portion of a toolset adapter for a toolset, wherein the adapter pocket is disposed on the top surface of the block;
    a plurality of fastener holes, each of the plurality of fastener holes being configured to receive one or more fastening devices, wherein the plurality of fastener holes are disposed annularly around the at least one adapter pocket;
    a plurality of machine attachment holes configured to receive one or more fasteners and thereby secure the adapter to a machining device, wherein the plurality of machine attachment holes are disposed on the top surface of the block;
    a fluid hole being configured to receive one or more fluids, wherein the fluid hole is disposed on one of the four sides of the block;
    a thru hole configured to dispense to the toolset the one or more fluids received by the fluid hole, wherein the thru hole extends from the top surface to the bottom surface of the block; and
    a plurality of internal passages disposed within the block and configured to allow the one or more fluids to flow through the adapter block, wherein the plurality of internal passages are oriented orthogonal relative to the at least one thru hole and fluidly connect the fluid hole and the thru hole.

12. The adapter of claim 11, further comprising a protrusion on one of the top surface, the bottom surface, or one of the four sides.

13. The adapter of claim 12, further comprising a clamp configured to receive one or more fasteners to secure the protrusion to one or more surfaces of the machining device, wherein the clamp is disposed on one of the top surface, the bottom surface, or one of the four sides.

14. The adapter of claim 11, wherein a diameter of the plurality of machine attachment holes is between 0.3 inches and 0.85 inches.

15. The adapter of claim 11, wherein the toolset is selected from a group consisting of a turning tool, a grooving tool, a threading tool, a front or back turning tool, and a knurling tool.

16. The adapter of claim 11, wherein the block is composed of ultra-high strength steel.

17. The adapter of claim 11, wherein a diameter of the plurality of internal passages is between 0.1 inches and 0.2 inches.

18. The adapter of claim 11, wherein a diameter of the plurality of fastener holes is between 0.05 inches and 0.5 inches.

19. The adapter of claim 11, wherein a diameter of the at least one adapter pocket is between 1.5 inches and 2.5 inches.

* * * * *